Figure 1:
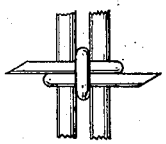

(No Model.)

R. H. WILES.
WIRE FENCE BARB.

No. 260,268. Patented June 27, 1882.

Witnesses.
E. N. Brainerd
J. A. Shutz

Inventor.
Robert H. Wiles

UNITED STATES PATENT OFFICE.

ROBERT H. WILES, OF FREEPORT, ILLINOIS.

WIRE-FENCE BARB.

SPECIFICATION forming part of Letters Patent No. 260,268, dated June 27, 1882.

Application filed April 29, 1882. (No model.)

*To all whom it may concern:*

Be it known that I, ROBERT H. WILES, a resident of Freeport, in the county of Stephenson and State of Illinois, have invented certain new and useful Improvements in Wire-Fence Barbs; and I do hereby declare the following to be a full, clear, and exact description of the invention, such as will enable others skilled in the art to which it pertains to make and use the same.

My invention relates to that class of fence-barbs which are formed of a single wire, and are used in combination with a two-strand cable, the form of the barb being such as to hold the strands of the cable together. It consists of a staple whose loop or eye lies between the strands of the cable, while each of its legs is wrapped about a strand of the cable and passed through the loop or eye. The barb thus formed ties the strands together, and both its ends are firmly secured by the loop through which they pass, thus absolutely preventing the unwrapping of either of them. The form of the barb is fully shown in the drawings herewith presented, in which—

Figure 2:
Figure 3:
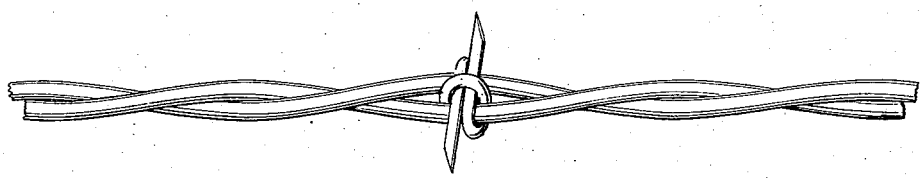
Figure 4:
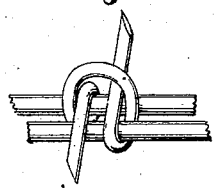

Figure 1 is a top view of the barb and cable-strands; Fig. 2, a side view of the barb, showing strands in section; Fig. 3, a perspective view of barb and cable; and Fig. 4, a perspective of barb loosely formed, showing relative positions of cable and parts of barb.

I am aware that numerous barbs so formed as to hold the strands of a two-strand cable together are in common use, and I therefore make no claim to such a barb in general; but what I claim as new, and desire to secure by Letters Patent, is—

The combination, with a two-strand cable, of a two-point barb consisting of a staple whose loop lies between the strands of said cable, while its two legs are wrapped about different strands and passed in opposite directions through said loop, substantially as shown and described.

In testimony whereof I have signed this specification in the presence of two subscribing witnesses.

ROBERT H. WILES.

Witnesses:
J. F. KLECKNER,
U. M. MAYER.